Feb. 25, 1941.  G. W. GARTNER  2,232,908
PERAMBULATOR
Filed Aug. 22, 1938  2 Sheets—Sheet 1
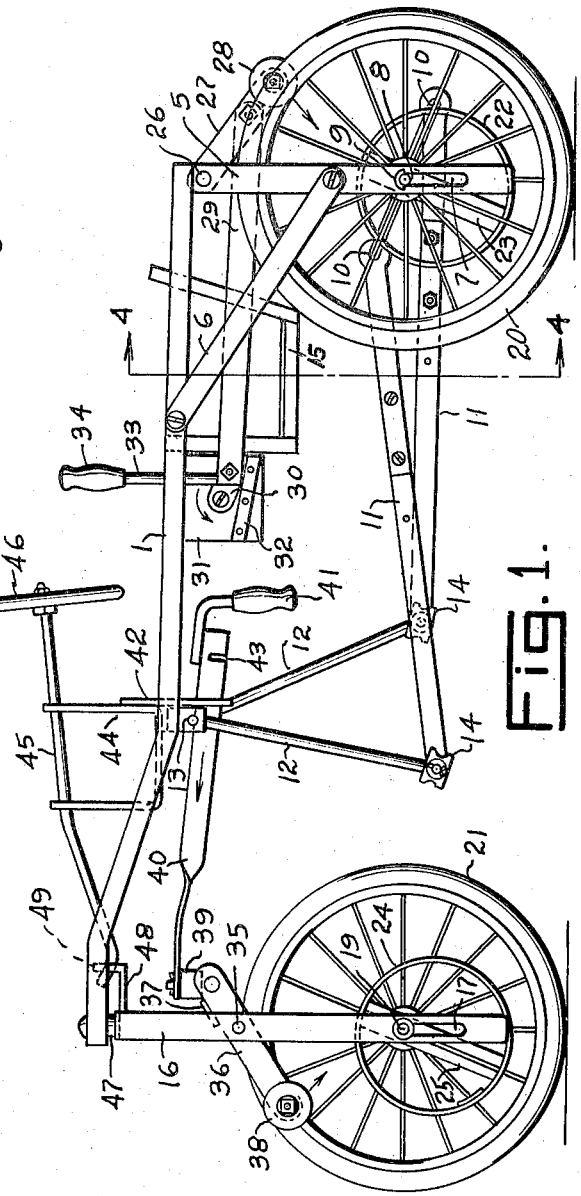
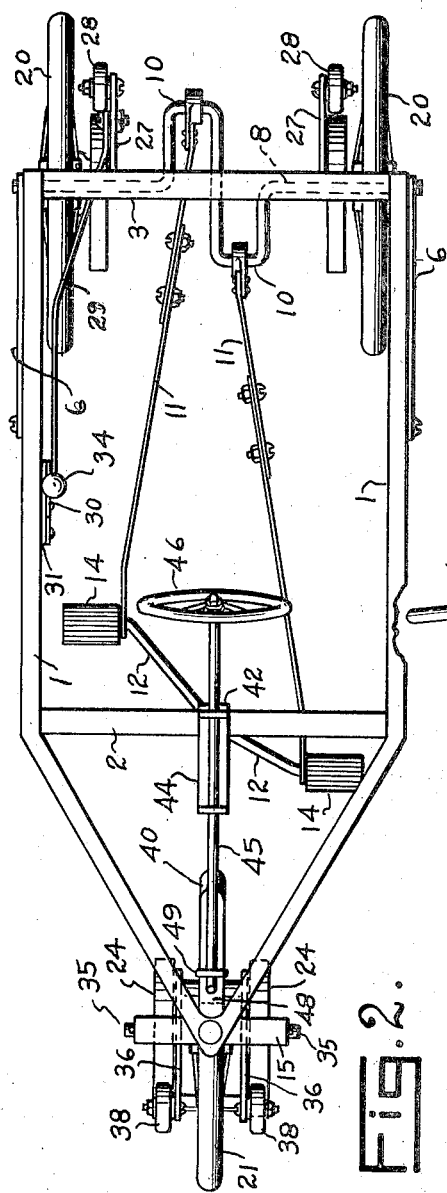
Inventor
GEORGE W. GARTNER
By
Edward V. Hardway
Attorney

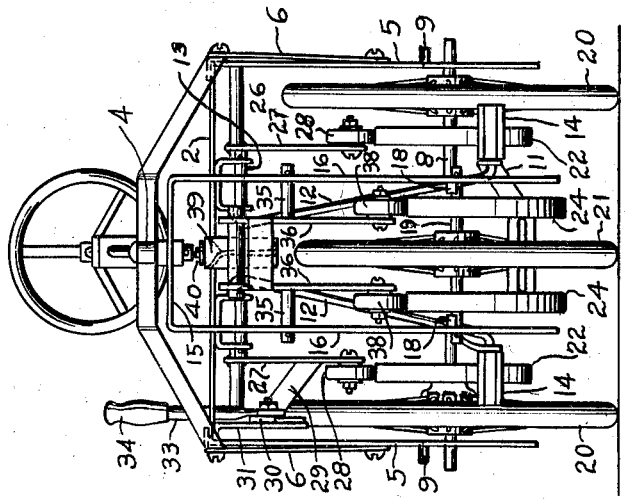

Patented Feb. 25, 1941

2,232,908

UNITED STATES PATENT OFFICE 2,232,908

PERAMBULATOR

George W. Gartner, Houston, Tex.

Application August 22, 1938, Serial No. 226,125

2 Claims. (Cl. 280—223)

This invention relates to a perambulator.

The invention discloses certain improvements over that type of construction disclosed in Patent No. 2,103,616 issued December 28, 1937.

An object of the invention is to provide a simplified construction of a vehicle particularly designed to be used by children and which may be readily propelled by the rider and including a chassis so mounted on carrier wheels that it will move in parallel relation with the surface over which the vehicle is moving, said vehicle embodying means under the control of the rider whereby the front end or rear end, or both, of the chassis may be caused to undulate as the vehicle moves along.

It is a further object of the invention to provide a very simple yet durable construction which may be easily controlled by the rider for regulating the movement of the chassis with relation to the surface over which the vehicle moves.

With the above and other objects in view the invention has particular relation to certain novel features of construction, operation and arrangement of parts, an example of which is given in this specification and illustrated in the accompanying drawings, wherein—

Figure 1 shows a side elevational view of the vehicle with the parts in position to cause the chassis to move in parallel relation with the surface over which the vehicle moves.

Figure 2 shows a plan view.

Figure 3 shows a front elevation with the parts in position to cause both front and rear ends of the chassis to undulate as the vehicle moves along.

Figure 4 shows a vertical, sectional view taken on the line 4, 4 of Figure 1 showing the parts in position to cause the rear end of the chassis to move up and down as the vehicle moves forwardly, and Figure 5 shows a fragmentary, perspective view.

Referring now more particularly to the drawings, wherein like numerals of reference designate the same parts in each of the figures, the numerals 1, 1 designate the side members of the main framework which are connected by the front and rear cross-bars 2, 3. The side members 1, 1 are extended forwardly and converge and are united at their forward ends and are provided with a vertical bearing 4. Said united forward ends are slightly elevated above the level of the main frame as shown in Figures 1 and 3. Depending from the rear ends of said side members are the legs 5, 5 which are firmly secured in position by the angle braces 6, 6 which are secured at their lower ends to the respective legs and at their upper ends to the side members 1 as shown in Figure 4. The legs 6 have the vertical slots as 7 to receive the respective ends of the rear axle 8. Located at the upper ends of the slots 7 are suitable half round bearings 9 formed of wear resisting material which are anchored to the side legs 5 and which normally rest on the axle 8. The axle 8 is formed with the oppositely arranged offset wrists 10, 10 on which the rear ends of the connecting bars 11, 11 have bearings. As clearly shown in Figures 1 and 2 these connecting rods may be adjusted as to length.

There are the pedal hangers 12, 12 whose upper ends are pivoted on a cross-pin 13 supported by the main framework adjacent its forward end and the lower ends of these hangers are outwardly turned and mounted on said outwardly turned ends are the pedals 14, 14 conveniently located in front of the driver's seat 15. The forward ends of the connecting bars 11 are pivotally connected to the outwardly turned ends of the hangers 12 at the inner ends of the pedals as more clearly shown in Figure 2. The vehicle may be accordingly easily propelled by the rider.

There is a front frame comprising the transverse bar 15 and the depending legs 16, 16 which depend from said cross-bar and which are provided with the vertical slots 17 whose upper ends have the half round bearings 18 formed of hard material which normally rest on the respective ends of the front axle 19. The rear and front axles are supported by the rear wheels 20, 20 and the front wheel 21 respectively, the ends of said axles extending through the rear slots 7 and the front slots 17. Fixed on the rear axle are the circular bands 22, 22. These bands are eccentric with respect to the axle, as shown in Figure 1. They are braced by cross-braces as 23 whose ends are welded or otherwise secured to the bands 22. These cross-braces 23 are also welded or otherwise fixed to the axle 8. On the front axle are the circular bands 24, 24 which are eccentric with respect to said axle and which are re-enforced by the cross-braces or bars 25 whose ends are welded or otherwise secured to said bands 24 and said cross-bars 25 are also welded or otherwise secured to the front axle 19.

There is a transverse shaft 26 whose ends are mounted to rotate in suitable bearings in the upper ends of the legs 5 and welded or otherwise secured to said shaft 26 are the depending arms 27, 27 whose lower ends carry the rollers 28, 28 which are aligned with the bands 22. A link 29 has its rear end pivoted to one of the arms 27 as shown in Figures 1 and 2 and has its forward end pivotally connected to an eccentric 30 which in turn has a pivotal connection with a depending side plate 31 carried by one of the side members 1. Across the inner side of the side plate 31 and secured thereto beneath the eccentric 30 there is a suitable stop bar 32 and integrally connected to the free end of the eccentric 30 there is an upstanding control rod 33 whose upper end carries the grip 34.

The control rod 33 may be elevated and swung around in forward position in the direction indicated by the arrow in Figure 1 until such forward movement is stopped by the stop bar 32. This will operate to partly rotate the shaft 26 and to carry the arms 27 into vertical position with the rollers 28 in contact with the circular bands 22. Thereupon, as the vehicle is moved forwardly or rearwardly, the eccentric bands 22 will operate through the rollers 28, the arms 27 and the shaft 26 to cause the rear end of the chassis to be elevated and lowered, the slots 7 permitting such movement; or the control rod 33 may be moved backwardly into the position shown in Figure 1 which will operate through the link 29 to move the rollers 28 out of contact with the bands 22 as shown in Figures 1 and 2 whereupon the bearings 9 will rest upon the ends of the axle 8 and the rear end of the chassis will move in a uniform parallel relation with the surface supporting the vehicle.

Rotatably mounted in the side legs 16 are the shafts 35 whose inner ends support the depending arms 36. The upper ends of these depending arms 36 are connected by a cross-bar 37 and their lower ends carry the rollers 38 aligned with the eccentric bands 24. Pivoted between the upper ends of the side arms 36 there is a block 39 with which the forward end of the control bar 40 has a swiveling connection.

Attached to the rear end of the control bar there is a grip 41 accessible to the rider. The rear end of the control bar works through a slot, or bearing, in the depending bracket 42 and has marginal notches as 43 in its lower margin shaped to receive the lower end of said bracket 42. The link 40 may be disengaged from the bracket and moved forwardly in the direction indicated by the arrow in Figure 1. This will swing the arms 36 into vertical position with the rollers 38 in contact with the bands 24 whereupon, as the vehicle is moved, the forward end of the chassis will be caused to move up and down or undulate as desired, the slots 17 in the legs 16 permitting this movement; or the link 40 may be moved rearwardly, into the position shown in Figure 1, which will move the rollers 38 forwardly out of contact with the bands 24 as also indicated in Figure 1.

Fastened to the forward cross-bar 2 there is a U-shaped bracket 44 to which the bracket 42 is fastened. The arms of the bracket 44 have aligned bearings to receive the steering shaft 45. Attached to the rear of the steering shaft 45, and accessible to the rider is the steering wheel 46.

The cross-bar 15 is provided with an upstanding spindle 47 which is rotatable in the vertical bearing 4 and extending rearwardly from said cross-bar there is a bracket 48 whose rear end has the upstanding lug 49. The forward end of the steering shaft 45 is upwardly turned and extended through a bearing in the lug 49 whereby upon rotation of the shaft 45 the spindle 47 may be turned thus correspondingly turning the front, or guide, wheel 21.

The vehicle may thus be guided as desired. It may be allowed to move along the supporting surface with the chassis maintained in parallel relation with said surface or the forward or rear end, or both, of the chassis may be caused to undulate as desired.

The drawings and description disclose what is now considered to be a preferred form of the invention by way of illustration only, while the broad principle of the invention will be defined by the appended claims.

What I claim is:

1. A vehicle comprising a frame, a front axle, and a rotatable rear axle supporting the frame, front and rear wheels on the respective axles, the rear wheels being fixed to the rear axle, circular bands forming bearings mounted eccentrically on the rear axle, means for supporting the rear of the frame on the rear circular bearings comprising swingable arms, rollers on the arms, a link for swinging the arms to carry the rollers into active position on said bearings to support the frame by said arms and rollers on the bearings to cause the frame to undulate as the vehicle advances, an eccentric mounted on the frame and connected to the link, a control rod for rotating the eccentric and connected thereto, a stop arranged to limit the range of oscillation of the eccentric in either direction whereby the link and arms are maintained in active position upon movement of the eccentric to one extreme position against the stop and are maintained in inactive position upon movement of the eccentric to the other extreme position.

2. A vehicle comprising a frame, a front axle and wheel thereon supporting the forward end of the frame, a rotatable rear axle supporting the rear end of the frame, rear wheels fixed on the rear axle, circular bands forming bearings mounted to rotate with the rear axle and eccentric with respect to the rear wheels, means for supporting the rear end of the frame on said bearings, said supporting means comprising swinging arms connected to the frame, rollers on the arms, a link connected at one end to the arms, a depending side plate on the frame, an eccentric pivotally connected to said plate and to which the other end of the link is pivoted, a stop carried by the plate beneath the eccentric, a control rod fixed to and upstanding from said eccentric through the manipulation of which said eccentric may be rotated to move the arms into active position to carry the rollers into supported position on the bearings whereby the frame will be caused to undulate as the vehicle advances, said stop being arranged to limit the movement of the eccentric in either direction whereby the link and arms may be maintained in said active position upon movement of the eccentric to one extreme position against the stop and in inactive position upon movement of the eccentric to the other extreme position against the stop.

GEORGE W. GARTNER.